(12) United States Patent
Falk

(45) Date of Patent:

(10) Patent No.: US 8,502,416 B2
Aug. 6, 2013

(54) METHOD AND CIRCUIT ARRANGEMENT FOR CONNECTING AT LEAST ONE STRING OF A PHOTOVOLTAIC SYSTEM TO AN INVERTER

(75) Inventor: Andreas Falk, Kassel (DE)

(73) Assignee: SMA Solar Technology AG, Niestetal (DE)

(*) Notice: Subject to any disclaimer, the term of this patent is extended or adjusted under 35 U.S.C. 154(b) by 428 days.

(21) Appl. No.: 12/851,627

(22) Filed: Aug. 6, 2010

(65) Prior Publication Data
US 2011/0031813 A1    Feb. 10, 2011

Related U.S. Application Data

(60) Provisional application No. 61/237,411, filed on Aug. 27, 2009.

(30) Foreign Application Priority Data

Aug. 6, 2009   (EP) ..................................... 09167378

(51) Int. Cl.
*H02J 3/00*    (2006.01)

(52) U.S. Cl.
USPC ........................................................ 307/77

(58) Field of Classification Search
None
See application file for complete search history.

(56) References Cited

U.S. PATENT DOCUMENTS

| 6,593,520 | B2* | 7/2003 | Kondo et al. ................. 136/244 |
| 7,989,983 | B2* | 8/2011 | Folts et al. ...................... 307/82 |
| 8,053,930 | B2* | 11/2011 | Cramer et al. .................. 307/82 |
| 8,217,534 | B2* | 7/2012 | Sok et al. ........................ 307/82 |
| 2005/0139259 | A1* | 6/2005 | Steigerwald et al. ......... 136/293 |
| 2008/0123226 | A1* | 5/2008 | McGinn et al. ................. 361/42 |
| 2009/0032082 | A1* | 2/2009 | Gilmore et al. ............... 136/244 |
| 2009/0190275 | A1 | 7/2009 | Gilmore et al. |
| 2010/0109442 | A1* | 5/2010 | Vega Betoret et al. .......... 307/82 |
| 2011/0210612 | A1* | 9/2011 | Leutwein ........................ 307/80 |
| 2012/0026631 | A1* | 2/2012 | Kazemi et al. ................. 361/42 |
| 2012/0139347 | A1* | 6/2012 | Hackenberg .................... 307/71 |

(Continued)

FOREIGN PATENT DOCUMENTS

| JP | 10285965 A | 10/1998 |
| JP | 2002091586 A | 3/2002 |
| WO | 2008108770 A1 | 9/2008 |

OTHER PUBLICATIONS

Günther Cramer, et al. "String Inverters Make Solar Power Cheaper." Elecktronik, Offprint from issue 18/1996. 11 Pages.

*Primary Examiner* — Stephen W Jackson
*Assistant Examiner* — Angela Brooks
(74) *Attorney, Agent, or Firm* — Eschweiler & Associates, LLC

(57) ABSTRACT

A circuit with series-connected solar modules separated into a first and second substring, wherein each substring includes a first and a second terminal, and a solar inverter configured to supply electrical energy from the solar modules to an AC power grid. The circuit includes a first switch coupled to the first terminal of the first substring to a first power cable of the inverter, and a second switch coupled to the second terminal of the first substring to a first terminal of the second substring at a center point, thereby coupling the first and second substrings to form at least one string. The circuit further includes a third switch couple to second terminal of the second substring, and a shared actuator to open the first switch, second switch, and third switch if a current between the center point and a circuit ground exceeds a threshold value.

21 Claims, 4 Drawing Sheets

U.S. PATENT DOCUMENTS

2012/0140363 A1* 6/2012 Jeppe et al. ..................... 361/18
2012/0153727 A1* 6/2012 Takano et al. ................... 307/75
2012/0163048 A1* 6/2012 Victor et al. .................... 363/55
2012/0174961 A1* 7/2012 Larson et al. ................. 136/246

* cited by examiner

METHOD AND CIRCUIT ARRANGEMENT FOR CONNECTING AT LEAST ONE STRING OF A PHOTOVOLTAIC SYSTEM TO AN INVERTER

REFERENCE TO RELATED APPLICATIONS

The present application claims priority to European Patent Application No. 09167378, filed on Aug. 6, 2009, and also claims priority to U.S. Provisional Patent Application Ser. No. 61/237,411, filed on Aug. 27, 2009, the contents both of which are hereby incorporated by reference in their entirety.

FIELD OF THE INVENTION

The invention relates to a system and method for connecting at least one string of a photovoltaic system that contains multiple solar modules to an inverter that supplies electrical power from the photovoltaic system to an AC power grid.

BACKGROUND

A high-performance photovoltaic system usually comprises multiple strings that contain multiple solar modules each. In such a system, the solar modules of each string are connected to each other either in series or in parallel to ensure that the desired output voltage and the desired output current are present at each string. To connect multiple strings of this type of photovoltaic system to a central inverter that supplies electrical power from the photovoltaic system to an AC power grid, it is often the case that long power cables have to be installed whose length is determined by the surface area of each string as well as the spatial arrangement of all the strings. These power cables are a significant cost factor given their large cross-sections and moreover suffer from continuous power loss due to the electrical resistance they cause. In general, it would be possible to reduce the requisite cross-section of the power cables and the amount of power loss if the output voltage of each string is increased through the serial connection of more solar modules while the same number of solar modules with less parallel connections would reduce the power accordingly. However, this concept cannot be implemented in all cases as it would cause the output voltages of the strings to rise to dangerous levels. In the USA, for example, voltages exceeding 600 V to ground are generally prohibited in conventional electrical systems. In practice, this limits not only the output voltages of the strings in a photovoltaic system but also the possibility of conducting smaller currents at higher voltages so as to minimize the cross-section of the power cables.

Known system features implemented in the "Solaron Remote PV Tie (RPT)" by Advanced Energy Industries, Inc., Fort Collins, Colorado, USA (see www.advanced-energy.com). Based on these features, a string of a photovoltaic system with multiple solar modules connected in series and parallel is split into two serially connected substrings with a safety switch installed between them. On the output side, two power cables with a power switch installed in each are used to connect the string to an inverter that supplies electrical power from the photovoltaic system to a three-phase 480 V AC power grid. While the photovoltaic system is operating, the AC power grid also provides a ground reference point for the system. If the photovoltaic system is disconnected from the inverter and thus the AC power grid when the power switch in the power cables opens, the safety switch between the two substrings opens and the switches in the potential cables connecting the substrings to the inverter on both sides of the safety switch close. Disconnecting both substrings limits the maximum voltage generated at each point of the photovoltaic system and thus the maximum voltage to ground to 600 volts. Via the potential cable, the two substrings can also be checked for the presence of ground faults, provided, of course, the photovoltaic system is switched off. If the photovoltaic system is switched on again, the switches in the potential cables to the substrings reopen at the same time the safety switch between the substrings closes to interrupt the contact provided by the potential cables between the substrings and the ground due to the potential reference point of the photovoltaic system via the 480 V AC power grid. Based on this known circuit arrangement, any ground fault that occurs while the photovoltaic system is operating gives rise to major short-circuit currents that must be interrupted by triggering a common line circuit breaker or residual current breaker. Moreover, while operating the photovoltaic system with the known circuit arrangement, the accumulation of voltages greater than 600 V to ground normally cannot be prevented. One advantage, however, is that only two power cables are needed to connect the string that supplies an output voltage of 1200 V to the inverter. All other cables between the inverter and the strings are not used to conduct power and can therefore have a comparatively small cross-section.

SUMMARY

The invention includes a method and a circuit arrangement for connecting at least one string of a photovoltaic system that contains multiple solar modules to an inverter that supplies electrical power from the photovoltaic system to an AC power grid and which can furthermore be used to detect ground faults in the area of the photovoltaic system while it is operating (i.e., under load) and prevent the resulting voltage to ground condition of more than half the output voltage of the string.

According to one embodiment of the method in which at least one safety switch is connected between the two substrings, the string is connected to the inverter via two power cables and an additional safety switch is installed in each of the power cables. The string that is split into two serially connected substrings is electrically isolated from the AC power grid at first. This isolation defines a fixed ground reference point for the photovoltaic system while it is operating. More specifically, the string's center point between the two substrings is connected to a circuit ground while the photovoltaic system is operating. During normal operation of the photovoltaic system, the grounding ensures that no voltage greater than half of the output voltage of the strings is present at any point in the system to ground. If, given a ground fault, a current flows from the center point of the string to the circuit ground and exceeds a maximum threshold value, to the extent it is desirable that the grounding of the string at the center point between its substrings be terminated to interrupt this current, the safety switches between the substrings and in the power cables from the string to the inverter are opened. Opening these safety switches disconnects the substrings from each other and from the power cables so that, even without grounding, no voltage greater than half of the output voltage of the string is present at any point in the photovoltaic system to ground.

Usually, the string is electrically isolated from the AC power grid using a transformer through which power is supplied to the grid by the inverter and which has a floating contact on the inverter side.

In one embodiment of the present invention, a shared potential bus bar is used to connect the center points of multiple strings to the circuit ground. If a current flows to the circuit ground, then all the strings will initially be disconnected from the inverter via the safety switches and split into substrings. Normally, however, a ground fault only occurs in one of the strings, which means the inverter can continue to function using the other strings of the photovoltaic system. To determine the defective string, a switch that disconnects all the strings from the potential bus bar and then reconnects them one by one is installed, in one embodiment, for each connection between the strings and the shared potential bus bar. A significant amount of ground current will arise when connecting the string that has the ground fault and consequently is identified as a defective string.

To allow for the localization of the ground fault even if the safety switch between the substrings of each string is opened, it is desired in one embodiment to have each side of the safety switch between the two substrings connected with the circuit ground individually (i.e., the shared potential bus bar) and then wait and see if the ground current reappears.

According to one embodiment, once the ground fault is localized, only the strings that do not have a ground fault will be reconnected to the inverter. With these strings, the supply of electrical energy from the photovoltaic system to the AC power grid can continue without interruption.

The power cables of multiple strings are also combined to power bus bars in one embodiment. In one embodiment, a power switch is included in each of the two power bus bars that most of the strings are connected to. This power switch resides inside the inverter's enclosure while the safety switches in the individual power cables are installed in the same location as the strings in one embodiment.

In one embodiment, the new circuit arrangement, a GFDI circuit breaker is used to connect the center point between the two substrings to the circuit ground while the photovoltaic system is operating. The GFDI circuit breaker triggers or trips when a ground current exceeds its maximum permissible value as defined by the GFDI circuit breaker, which, in turn, indicates the presence of a ground fault. If the GFDI circuit breaker trips, then the safety switches are opened accordingly, in one embodiment.

Alternatively, in one embodiment the center point between the two substrings are grounded via a resistor to achieve a so-called soft grounding in which the ground fault protection devices of the circuit arrangement detect any voltage drop across the resistor. If this voltage rises to a specific level, then it serves as another indicator that a ground current limit has been exceeded. The safety switches are then opened accordingly. In one embodiment it is advantageous to have the resistor serially connected with an additional circuit breaker that opens to interrupt the excessively high ground current.

In one embodiment of the invention, the center point between the two substrings is connected to a circuit ground in the inverter's enclosure. The center point is thus connected to circuit ground in the central inverter, which means a GFDI circuit breaker or other circuit breaker for limiting the ground current can easily be reset to either localize the ground fault or continue operating the strings that are unaffected by any of the ground faults actually found and whose center points remain grounded.

To allow for the grounding of the center point in an inverter's enclosure, in one embodiment it is not necessary to route power cables from the center point to the enclosure. A basic potential cable with a small cross-section routed from the string to the enclosure is sufficient in this instance. In one embodiment, multiple basic cables with small cross-sections are routed from the string to the enclosure in addition to the two power cables. In this embodiment, at least one of the switches assigned to a substring is placed between the circuit ground and each substring and then closed individually by the ground fault protection devices in order to localize a ground fault. In one embodiment, these two switches for each string, which are used to localize ground faults, comprise two serially connected safety switches installed between the two substrings. Note, however, that these safety switches are placed in the same location as the string since they carry the power current between the substrings. They are also individually closable in order to localize ground faults in one embodiment. It is nonetheless possible and contemplated in one embodiment to arrange the switches assigned to the individual substrings in an inverter's enclosure. In such an embodiment one potential cable for each substring are routed to the enclosure where the switches are located. In one embodiment, the switches are connected between the relevant potential cable and a shared potential bus bar is used to ground multiple strings.

While the photovoltaic system is operating, the switches assigned to the individual substrings in the inverter's enclosure remain closed in one embodiment. Should a current arise from the shared potential bus bar to circuit ground, the switches will open so that any circuit breaker that the ground current causes to open can be reset without having it triggered directly. If the switches in the individual potential cables are closed successively, the ground current will reappear after the switch assigned to the substring with the ground fault closes. The string that contains this substring will not be used until the ground fault is eliminated, i.e., the safety switches assigned to the string and the switches in the potential cables remain open.

In one embodiment, the safety switches are used to actually connect or disconnect the entire photovoltaic system to or from the inverter. A central power switch in the power bus bars inside the inverter can also be used for this purpose. Note that the power cables from multiple strings are connected to these power bus bars.

In one embodiment the method and the circuit arrangement are configured to connect multiple strings to a remote inverter (i.e., 10 to 1000 meters away) using just two power cables, whereby all of the safety switches of each string are placed in the same location as this string. Only cables that do not carry a power current and therefore have a small cross-section are routed from the respective string to the inverter.

Further advantageous embodiments of the invention can be found in the patent claims, the description and drawings. The advantages of the features and combinations of features mentioned in the introduction of this description merely serve as examples and may be applied either alternatively or cumulatively without the advantages being necessarily achieved by embodiments according to the invention. Additional features can be found in the drawings—particularly in the depicted geometries and the relative measurements of components with respect to each other as well as their relative arrangement and functional interaction. The combination of features in different embodiments of the invention or the combination of features from different patent claims may also deviate from the selected retroactive applications of the patent claims and is hereby encouraged. This also applies to any features depicted in separate drawings or mentioned in their description. These features can also be combined with the features of different patent claims. The features defined in the patent claims may also be excluded in other embodiments of the invention.

DESCRIPTION OF THE FIGURES

The invention shall be further explained and described in the following with reference to the enclosed figures and based on examples of the various embodiments.

DESCRIPTION

Figure 1:
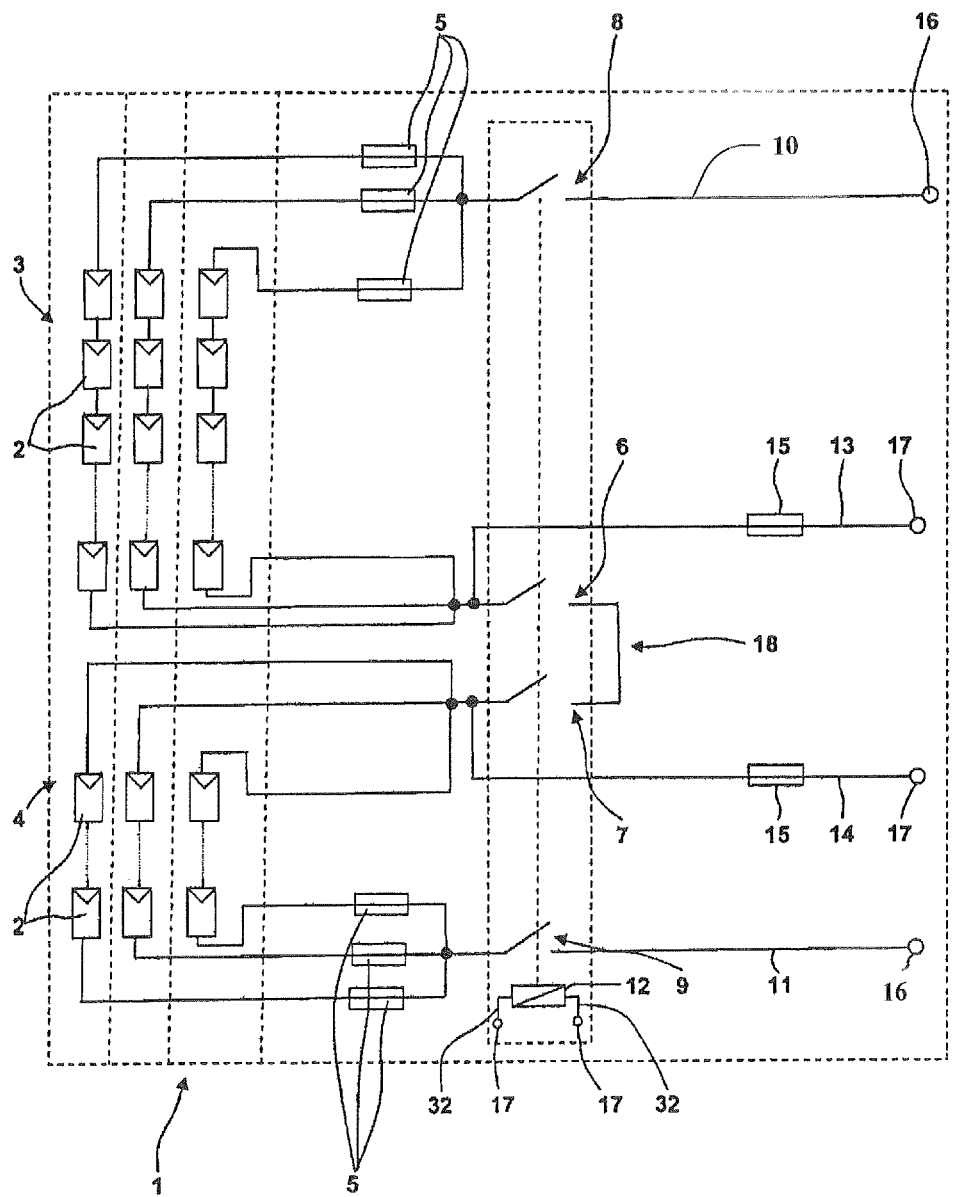
FIG. 1 depicts the layout of a string in a circuit arrangement specified by the invention.

FIG. 1 depicts a string 1 of a photovoltaic system which contains a multitude of solar modules 2 and which is split into two substrings 3 and 4 with the same number of solar modules 2 each, for example. In each string, the solar modules are arranged in multiple serial circuits that are individually protected by a fuse 5 and connected to each other in parallel. The substrings 3 and 4 are serially connected through two safety switches 6 and 7. Additional safety switches 8 and 9 are installed in power cables 10 and 11. These cables are connected to the free ends of substrings 3 and 4 and carry the electrical power generated by string 1. A shared actuator 12 is provided for all safety switches 6 through 9. In one embodiment the actuator 12 is configured so that the switches 6 through 9 only close when the control signal is present. At the safety switches 6 and 7, the potential cables 13 and 14 lead away from the two substrings 3 and 4. Fuses 15 are provided in the potential cables. The string 1 depicted in FIG. 1 features a total of six terminals 16 and 17, whereby only the two terminals 16 of the power cables 10 and 11 with large cross-sections have to be connected while the terminals 17 for the potential cables 13 and 14 and the actuator 12 can be connected with the wires of a basic multicore control cable with a comparatively small cross-section. To connect the string 1 shown in FIG. 1 to an inverter at a greater distance, relatively little effort is needed compared to the output power of string 1 provided with the sum of output voltages of the substrings 3 and 4 amounting to, say, 600 V each (i.e., 1200 V) and thus by only half the current that would be supplied if substrings 3 and 4 were connected in parallel to limit the voltage.

Figure 2:
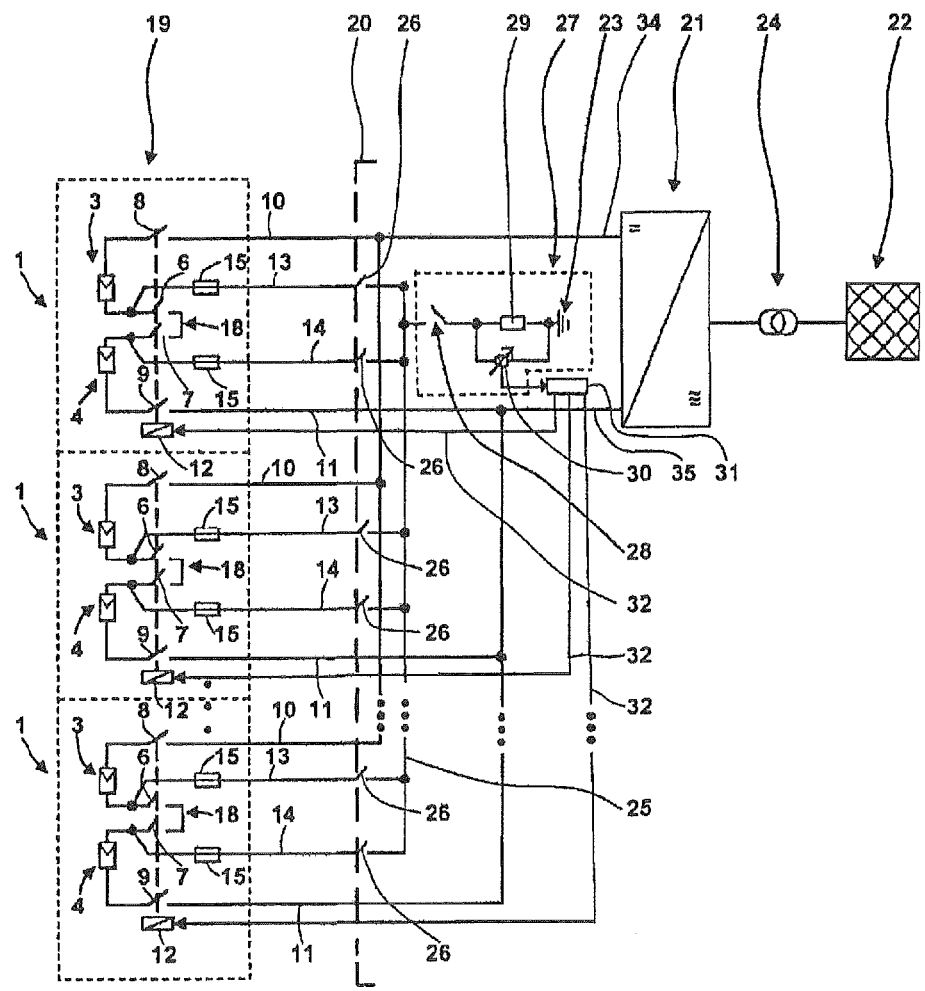
FIG. 2 shows the connection of multiple strings (as per FIG. 1) with an inverter in one of the first embodiments of the circuit arrangement specified by the invention.

In the given example, to avoid voltages to ground of more than 600 V even if the two substrings are serially connected when safety switches 6 and 7 close, a center point 18 of string 1 between the two substrings 3 and 4 is connected to the circuit ground 23 while the photovoltaic system 19 is operating with the circuit arrangement depicted in FIG. 2. The photovoltaic system 19 contains multiple strings 1 (three in this example). Note that FIG. 2 does not show all the details of the string 1 as depicted in FIG. 1. The strings 1 are connected to the circuit ground 23 via the potential cables 13 and 14 in the enclosure 20 of an inverter 21 that is used to supply electrical energy from the photovoltaic system 19 to an AC power grid 22. In order to ground the center points 18 of the strings 1 while the photovoltaic system 19 is operating, the photovoltaic system 19 is electrically isolated from the AC power grid 22 and hence from the system's ground, for example by a transformer 24 comprised in the inverter 21 or installed between the inverter 21 and the AC power grid 22. The center points 18 of the individual strings 1 are grounded via a shared potential bus bar 25 to which the potential cables 13 and 14 are connected in the enclosure 20. A switch 26 is provided in each potential cable 13 and 14 at the shared potential bus bar 25 in the enclosure 20. The fuses 15 in the potential cables 13 and 14 prevent a short-circuit current from arising through the potential bus bar 25. The potential bus bar 25 is grounded by means of a soft-grounding device 27 in which a circuit breaker 28 is serially connected to a resistor 29 between the potential bus bar 25 and the circuit ground 23. While the photovoltaic system 1 is operating, both switch 26 and switch 28 are closed, and the voltage drop across the resistor is used to measure the current flowing from the center points 18 to the circuit ground 23 is monitored by a voltage measurement device 30. When the voltage drop indicates that the ground current exceeds a maximum threshold value, the actuators 12 open the safety switches 6 through 9 after receiving a signal from a controller 31 via the activation lines 32. At the same time, switch 28 and switch 26 are opened. By opening the safety switches 6 through 9, the substrings 3 and 4 of all strings 1 are disconnected so that the maximum amount of output voltage of a substring 3 or 4 to ground is present in the area of the photovoltaic system 19, even if a ground fault has occurred at the end of substring 3 or 4 that is facing away from the center point 18 and the ground connection of the center point 18 has been terminated when the switch 28 opens to interrupt the unwanted ground current. To localize this ground fault on the substring 3 or 4 in question without generating voltages greater than, for example, 600 V within the area of the photovoltaic system 19, the safety switches 6 through 9 remain open. Switch 28 is closed and the switches 26 will be closed successively until the ground current caused by the voltage drop across the resistor 29 reappears. This is the case if the switch 26 for the substring 3 or 4 that is affected by the ground fault is closed. The string 1 with the substring 3 or 4 that is identified in this manner will stop working until the ground fault is eliminated. This means that the safety switches 6 through 9 of this string remain open. The associated switch 26 also remains open. The other strings 1, however, can continue to be operated safely by closing their safety switches 6 through 9 and the associated switches 26 together with switch 28 to ground their center points.

Figure 3:
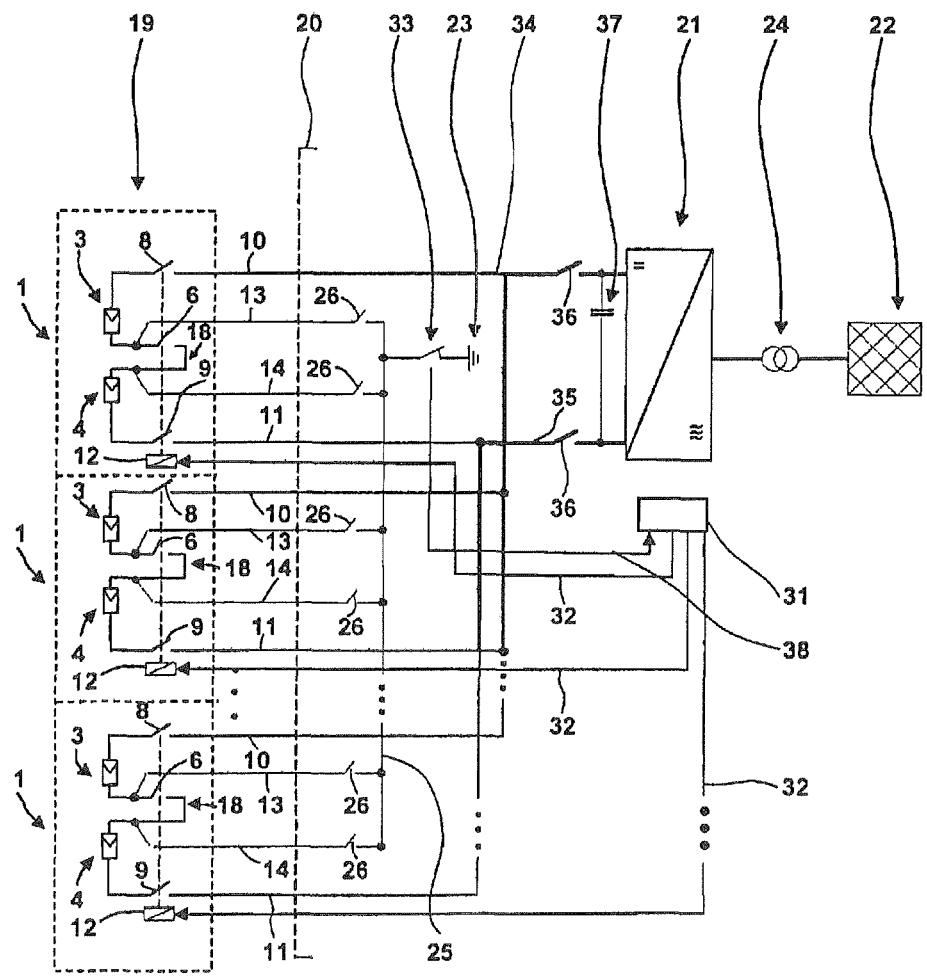
FIG. 3 depicts a second circuit arrangement specified by the invention in which both the individual strings as well as the inverter vary in relation to FIG. 2.

In the embodiment of the circuit arrangement depicted in FIG. 3, the center points 18 are grounded over the shared potential bus bar 25 using a GFDI circuit breaker 33, which trips (i.e., opens) when a ground current that exceeds a maximum threshold value is detected. In this respect, the GFDI circuit breaker 33 offers an alternative to the soft grounding device 27 shown in FIG. 2. Only one safety switch 6 is provided between the substrings 3 and 4 for each string shown in FIG. 3 and the fuses 15 in the potential cables 13 and 14 may be excluded. As per FIGS. 1 and 2, these fuses 15 typically have a lower trigger value than the soft grounding device 27 or the GFDI circuit breaker 33. Finally, FIG. 3 also indicates that power switches 36 for connecting the photovoltaic system 19 to the inverter 21 are provided in the power bus bars 34 and 35. The power cables 10 and 11 from the individual strings 1 are connected to these bus bars. In addition, a buffer capacitor 37 between power bus bars 34 and 35 is connected to the input of the inverter 21. However, the basic function of the circuit arrangement shown in FIG. 3 matches the function of the arrangement shown in FIG. 2.

Figure 4:
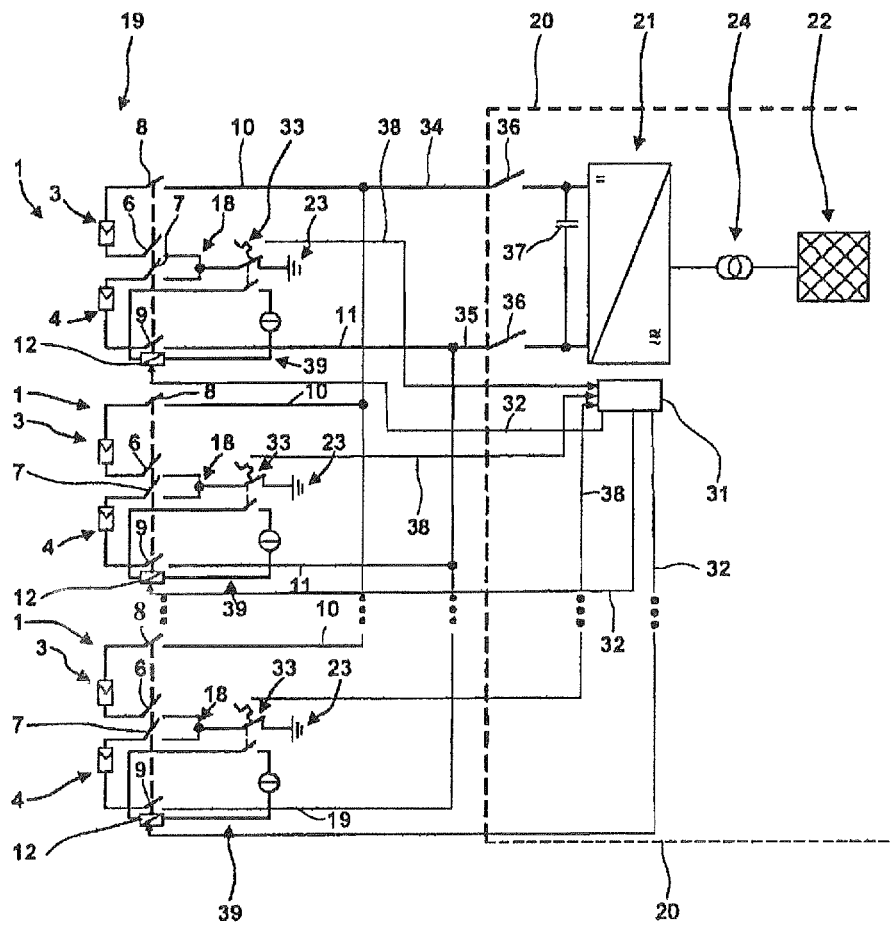
FIG. 4 shows yet another embodiment of the circuit arrangement specified by the invention.

The circuit arrangement in FIG. 4 is a modification of the circuit arrangement in FIG. 3 insofar as each string 1 has its own GFDI circuit breaker 33 located in the same location as the string 1 and a signal line 38 is routed from this circuit breaker to the central controller 31 in the enclosure 20 of the inverter 21. In this arrangement, the actuators 12 that open the safety switches 6 through 9 are not activated by the controller 31 via the activation lines 32. Instead, each of the actuators 12 are connected to the GFDI circuit breaker via a coupling device 39 in such a way that the safety switches 6 through 9 are opened directly by the circuit breaker whenever it trips. The controller 31 can then be used to selectively close the two safety switches 6 and 7 that are also included in this arrangement in order to localize the substring 3 or 4 in which the ground fault that triggered the GFDI circuit breaker has occurred. As a matter of course, the GFDI circuit breaker must be reset (i.e., closed again) before the ground fault can be localized. This selective checking of the substrings 3 and 4 is particularly advantageous given that multiple GFDI circuit breakers 33 can be tripped when a ground fault occurs in just one substring 3 or 4 of the photovoltaic system 19. Before the substrings 3 and 4 of any string 1 can be reconnected to each other without risk, it must be assured that the ground fault is not present in any of these substrings 3 and 4 in one embodiment. If the controller 31 is unable to activate the safety switches 6 and 7 separately from each other and separately from the other safety switches 8 and 9, each GFDI circuit breaker 33 can also be connected to the center point 18 via the two potential cables 13 and 14 that contain switch 26 as per FIG. 3. This would also make it possible to exclude one of the safety switches 6 and 7 in each string 1. Similar to the activation lines 32, the signal lines 38 can have the same small cross-section as the potential cables 13 and 14 as depicted in FIGS. 1, 2, and 3.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A circuit arrangement in combination with a first string of series-connected solar modules separated into a first substring and a second substring, wherein each substring comprises a first terminal and a second terminal, and further in combination with a solar inverter configured to supply electrical energy from the solar modules to an AC power grid, comprising:
   a first switch configured to selectively couple the first terminal of the first substring to a first power cable of the inverter;
   a second switching circuit configured to selectively couple the second terminal of the first substring to a first terminal of the second substring at a center point, thereby coupling the first and second substrings to form the at least one string;
   a third switch configured to selectively couple the second terminal of the second substring to a second power cable of the inverter;
   a shared actuator configured to open the first switch, the second switching circuit, and the third switch if a current between the center point and a circuit ground exceeds a threshold value; and
   a second string of series-connected solar modules with first and second substrings selectively coupled to a further center point, wherein the center point of the second string is connected to the center point of the first string by a shared potential bus bar.

2. The circuit arrangement of claim 1, wherein the second switching circuit comprises a first substring switch configured to selectively couple the second terminal of the first substring to the center point, and a second substring switch configured to selectively couple the first terminal of the second substring to the center point.

3. The circuit arrangement of claim 1, further comprising a soft grounding circuit selectively coupled to the shared potential bus bar through a soft grounding circuit switch, wherein the soft grounding circuit is configured to output an indication signal when a current greater than the threshold value conducts therethrough, and wherein the center points of the first and second strings of series-connected solar modules are selectively coupled to the shared potential bus bar through one or more first and second substring ground switches, respectively.

4. The circuit arrangement of claim 3, wherein the soft grounding circuit is further configured to trigger an opening of the one or more of the first and second substring ground switches upon an output of the indication signal.

5. The circuit arrangement of claim 3, wherein the soft grounding circuit is further configured to trigger an opening of the soft grounding circuit switch when a current greater than the threshold value conducts therethrough.

6. The circuit arrangement of claim 1, further comprising:
   a first substring ground switch configured to selectively couple the center point of the first string of series-connected solar modules to the shared potential bus bar;
   a second substring ground switch configured to selectively coupled the center point of the second string of series-connected solar modules to the shared potential bus bar;
   a controller configured to transmit a control signal to the shared actuator when the ground current associated with the center point exceeds the threshold value; and
   the controller further configured to maintain the first switch, the second switching circuit, and the third switch open, while closing the soft grounding circuit switch, and then successively closing the first substring ground switch and the second substring ground switch to ascertain a ground fault associated with one of the first and second substrings based on a current detected by the soft grounding circuit.

7. The circuit arrangement of claim 1, further comprising:
   a circuit breaker connected to the shared potential bus bar, and configured to disconnect the shared potential bus bar from the circuit ground and generate an indication signal when a current between the shared potential bus bar and the circuit ground exceeds the threshold value.

8. The circuit arrangement of claim 1, wherein the first and second substring ground switches are physically located within an enclosure of the inverter.

9. The circuit arrangement of claim 1, wherein the center point is connected to the circuit ground at a connection point within an enclosure of the inverter.

10. A circuit arrangement in combination with a first string of series-connected solar modules separated into a first substring and a second substring, wherein each substring comprises a first terminal and a second terminal, and further in combination with a solar inverter configured to supply electrical energy from the solar modules to an AC power grid, comprising:
- a first switch configured to selectively couple the first terminal of the first substring to a first power cable of the inverter;
- a second switching circuit configured to selectively couple the second terminal of the first substring to a first terminal of the second substring at a center point, thereby coupling the first and second substrings to form the at least one string;
- a third switch configured to selectively couple the second terminal of the second substring to a second power cable of the inverter;
- a shared actuator configured to open the first switch, the second switching circuit, and the third switch if a current between the center point and a circuit ground exceeds a threshold value; and
- a circuit breaker coupled to the center point, and configured to create an open circuit between the center point and the circuit ground, and trigger the shared actuator if the current exceeds the maximum threshold value.

11. A solar system arrangement, comprising:
- a first string of series-connected solar modules separated into a first substring and a second substring, wherein each substring comprises a first terminal and a second terminal;
- a solar inverter configured to supply electrical energy from the solar modules to an AC power grid;
- a switching control network operatively coupled to the first string of series-connected solar modules and the solar inverter, comprising:
  - a first switch configured to selectively couple the first terminal of the first substring to a first power cable of the inverter;
  - a second switching circuit configured to selectively couple the second terminal of the first substring to a first terminal of the second substring at a center point, thereby coupling the first and second substrings to form the at least one string;
  - a third switch configured to selectively couple the second terminal of the second substring to a second power cable of the inverter; and
  - a shared actuator configured to open the first switch, the second switching circuit, and the third switch if a current between the center point and a circuit ground exceeds a threshold value; and
- a second string of series-connected solar modules with first and second substrings selectively coupled to a further center point, wherein the center point of the second string is connected to the center point of the first string by a shared potential bus bar.

12. The solar system arrangement of claim 11, wherein the second switching circuit comprises a first substring switch configured to selectively couple the second terminal of the first substring to the center point, and a second substring switch configured to selectively couple the first terminal of the second substring to the center point.

13. The solar system arrangement of claim 11, further comprising a soft grounding circuit selectively coupled to the shared potential bus bar through a soft grounding circuit switch, wherein the soft grounding circuit is configured to output an indication signal when a ground current greater than the threshold value conducts therethrough, and wherein the center points of the first and second strings of series-connected solar modules are selectively coupled to the shared potential bus bar through one or more first and second substring ground switches, respectively.

14. The solar system arrangement of claim 13, wherein the soft grounding circuit is further configured to trigger an opening of the one or more of the first and second substring ground switches and the soft grounding circuit switch when a current greater than the threshold value conducts therethrough.

15. The solar system arrangement of claim 11, further comprising:
- a first substring ground switch configured to selectively couple the center point of the first string of series-connected solar modules to the shared potential bus bar;
- a second substring ground switch configured to selectively coupled the center point of the second string of series-connected solar modules to the shared potential bus bar;
- a controller configured to transmit a control signal to the shared actuator when the ground current associated with the center point exceeds the threshold value; and
- the controller further configured to maintain the first switch, the second switching circuit, and the third switch open, while closing the soft grounding circuit switch, and then successively closing the first substring ground switch and the second substring ground switch to ascertain a ground fault associated with one of the first and second substrings based on a current detected by the soft grounding circuit.

16. The solar system arrangement of claim 11, further comprising:
- a circuit breaker connected to the shared potential bus bar, and configured to disconnect the shared potential bus bar from the circuit ground and generate an indication signal when a current between the shared potential bus bar and the circuit ground exceeds the threshold value.

17. The solar system arrangement of claim 11, wherein the first and second substring ground switches are physically located within an enclosure of the inverter.

18. The solar system arrangement of claim 11, wherein the center point is connected to the circuit ground potential at a connection point within an enclosure of the inverter.

19. A solar system arrangement, comprising:
- a first string of series-connected solar modules separated into a first substring and a second substring, wherein each substring comprises a first terminal and a second terminal;
- a solar inverter configured to supply electrical energy from the solar modules to an AC power grid;
- a switching control network operatively coupled to the first string of series-connected solar modules and the solar inverter, comprising:
  - a first switch configured to selectively couple the first terminal of the first substring to a first power cable of the inverter;
  - a second switching circuit configured to selectively couple the second terminal of the first substring to a first terminal of the second substring at a center point, thereby coupling the first and second substrings to form the at least one string;
  - a third switch configured to selectively couple the second terminal of the second substring to a second power cable of the inverter; and
  - a shared actuator configured to open the first switch, the second switching circuit, and the third switch if a current between the center point and a circuit ground exceeds a threshold value; and
- a circuit breaker coupled to the center point, and configured to create an open circuit between the center point and the circuit ground, and trigger the shared actuator if the ground current associated with the center point exceeds the maximum threshold value.

20. A method to locate a ground fault condition within a circuit arrangement comprising a first and a second string of series-connected solar modules, each string separated into a first substring and a second substring selectively coupled to each other at a center point by a second switching circuit, wherein each string is configured to be selectively coupled to power cables of a solar inverter configured to supply electrical energy from the solar modules to an AC power grid by corresponding first and third switches, the center points of the first and the second string being interconnected by a shared potential bus bar, the method comprising:

determining a current between the shared potential bus bar and a circuit ground;

opening the second switching circuit and the first and third switches of the first string and the second string, if the current exceeds the threshold value;

successively reconnecting the first string and the second string to the power cable of the inverter and the shared potential bus bar while monitoring the current to identify the string in which the ground fault condition is present.

21. The method of claim 20, wherein successively reconnecting the first and second strings comprises individually reconnecting the substrings of the one of the first and second strings to the power cables and the shared potential bus bar.

* * * * *